(12) United States Patent
Sanders et al.

(10) Patent No.: US 10,843,291 B2
(45) Date of Patent: Nov. 24, 2020

(54) WELDING IN PREPARATION FOR SUPERPLASTIC FORMING

(75) Inventors: Daniel G. Sanders, Lake Tapps, WA (US); Luis R. Leon, Federal Way, WA (US); Paul D. Edwards, Seattle, WA (US); Gregory L. Ramsey, Seabeck, WA (US); Gary W. Coleman, Snohomish, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 12/617,022

(22) Filed: Nov. 12, 2009

(65) Prior Publication Data

US 2013/0240609 A1 Sep. 19, 2013

Related U.S. Application Data

(60) Provisional application No. 61/199,296, filed on Nov. 15, 2008.

(51) Int. Cl.
*B23K 20/12* (2006.01)
*B21D 26/055* (2011.01)
(Continued)

(52) U.S. Cl.
CPC .......... *B23K 20/122* (2013.01); *B21D 26/021* (2013.01); *B21D 26/055* (2013.01);
(Continued)

(58) Field of Classification Search
CPC .. B23K 20/12; B23K 20/1225; B23K 20/125; B23K 20/1255; B23K 20/127;
(Continued)

(56) References Cited

U.S. PATENT DOCUMENTS 2,882,588 A 4/1959 Rieppel et al.
4,560,856 A * 12/1985 Miller .................. B23K 26/043
219/121.63

(Continued)

FOREIGN PATENT DOCUMENTS

EP 1920868 A1 5/2008
JP 2000061664 A 2/2000
(Continued)

OTHER PUBLICATIONS

PCT Search Report for application PCT/US2009/064417 dated Feb. 26, 2010.
(Continued)

*Primary Examiner* — Megha M Gaitonde
(74) *Attorney, Agent, or Firm* — Yee & Associates, P.C.

(57) ABSTRACT

A component is formed by welding a plurality of sheets of metal to form a blank with a number of weld nuggets, placing the blank between a die section and a lid section, heating the die section to heat the blank, and introducing a pressurized gas between the lid section and the die section to press the blank into a mold in the die section to form a component. The number of weld nuggets has a desired thickness ratio between about 1.1 to about 1.25 such that the plurality of sheets of metal and the component formed have a number of characteristics that are substantially the same.

10 Claims, 18 Drawing Sheets

(51) Int. Cl.
  *B21D 26/021* (2011.01)
  *B23K 26/24* (2014.01)
  *B23K 103/04* (2006.01)
  *B23K 103/10* (2006.01)
  *B23K 103/14* (2006.01)
  *B23K 101/00* (2006.01)

(52) U.S. Cl.
  CPC ........ *B23K 20/128* (2013.01); *B23K 20/1245* (2013.01); *B23K 26/24* (2013.01); *B23K 2101/006* (2018.08); *B23K 2103/04* (2018.08); *B23K 2103/10* (2018.08); *B23K 2103/14* (2018.08); *G01N 2203/0296* (2013.01)

(58) Field of Classification Search
  CPC .. B23K 20/028; B23K 20/122; B23K 20/129; B21D 47/00; B21D 47/04; B21D 51/02; B21D 51/16; B21D 53/18; B21D 53/16; B21D 53/84; B21D 53/92; B21D 26/02; B21D 26/021; B21D 26/053; B21D 26/055; B21D 26/057; B21D 26/059
  USPC .......... 228/112.1, 113, 114, 141.1, 157, 178, 228/181, 182–184, 190, 2.1, 4.1, 6.1
  See application file for complete search history.

(56) References Cited

U.S. PATENT DOCUMENTS

| | | | |
|---|---|---|---|
| 5,654,060 A * | 8/1997 | Holman et al. | 428/68 |
| 6,045,028 A | 4/2000 | Martin et al. | |
| 6,811,632 B2 * | 11/2004 | Nelson et al. | 156/73.5 |
| 7,416,105 B2 * | 8/2008 | Pitt et al. | 228/157 |
| 7,431,196 B2 * | 10/2008 | Eilert et al. | 228/181 |
| 2002/0079351 A1 | 6/2002 | Mishra et al. | |
| 2002/0142183 A1 * | 10/2002 | Colligan | 428/593 |
| 2003/0047587 A1 * | 3/2003 | Aono et al. | 228/112.1 |
| 2003/0098336 A1 * | 5/2003 | Yamashita | 228/112.1 |
| 2003/0205565 A1 * | 11/2003 | Nelson | B29C 65/0672 219/148 |
| 2004/0197532 A1 * | 10/2004 | Barnes | 428/195.1 |
| 2005/0029330 A1 * | 2/2005 | Kohn | 228/112.1 |
| 2006/0086774 A1 | 4/2006 | Sanders et al. | |
| 2006/0249560 A1 | 11/2006 | Pitt et al. | |
| 2007/0102494 A1 * | 5/2007 | Connelly et al. | 228/157 |
| 2010/0096438 A1 * | 4/2010 | Sato | B23K 20/1225 228/114 |
| 2010/0136369 A1 * | 6/2010 | Ayer | B23K 20/1225 428/683 |

FOREIGN PATENT DOCUMENTS

| | | | | |
|---|---|---|---|---|
| JP | 2007044755 A | | 2/2007 | |
| WO | WO 2008/041380 | * | 4/2008 | |
| WO | WO-2008041380 A1 | * | 4/2008 | ......... B23K 20/1225 |
| WO | WO2010057012 A1 | | 5/2010 | |

OTHER PUBLICATIONS

Notice of Reasons for Rejection and English Translation, dated Jun. 16, 2015, regarding Japanese Patent Application No. 2011-536524, 7 pages.
Canadian Intellectual Property Office Examination Search Report, dated Jul. 31, 2015, regarding Application No. 2,734,163, 5 pages.
Extended European Search Report, dated Sep. 8, 2015, regarding Application No. EP15177230.8, 7 pages.
Sanders et al., "Superplastically Formed Friction Stir Welded Tailored Aluminum and Titanium Blanks for Aerospace Applications," 6th EUROSPF Conference, Sep. 2008, 10 pages.
Canadian Intellectual Property Office Examination Search Report, dated May 5, 2017, regarding Application No. 2,935,846, 4 pages.
Canadian Intellectual Property Office Examination Search Report, dated Nov. 6, 2019, regarding Application No. 2935834, 3 pages.

* cited by examiner

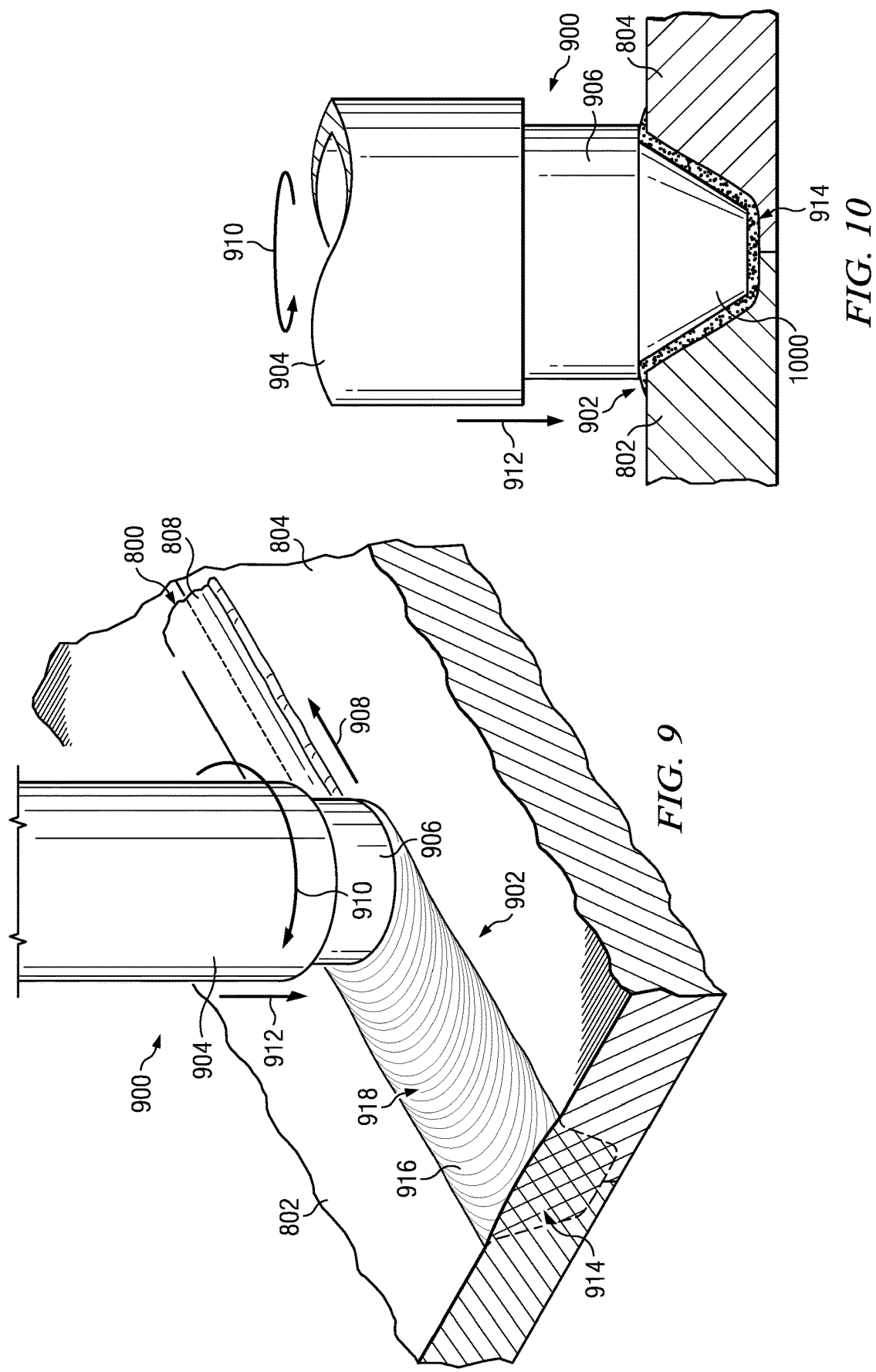

2100

| AVERAGE PROPERTIES | YIELD STRENGTH | ULTIMATE STRENGTH | % ELONGATION |
|---|---|---|---|
| AS WELDED (AW) | 1.59 | -0.35 | -56.54 |
| AW & STRESS RELIEVE | 5.02 | 1.34 | -55.26 |
| UNIVERSITY OF SOUTH CAROLINA | 5.78 | 3.09 | -44.43 |
| EDISON WELDING INST. | -0.40 | -3.39 | -73.10 |
| FINE GRAIN TI | 7.12 | 2.77 | -44.86 |
| REGULAR GRAIN TI | 0.76 | -1.02 | -63.26 |

| CONDITION NUMBER | PROCESSES USED | ORIGINAL THICKNESS (mm) | LONGITUDINAL OR TRANSVERSE FSW |
|---|---|---|---|
| 1 | PARENT METAL NO FSW | 2.5 | NOT FSW WELDED |
| 2 | AS FSW | 2.5 | TRANSVERSE |
| 3 | AS FSW AND STRESS RELIEF | 2.5 | TRANSVERSE |
| 4 | FSW, STRESS RELIEF AND MACHINED | 3 | TRANSVERSE |
| 5 | FSW, STRESS RELIEF AND LPB | 2.5 | TRANSVERSE |
| 6 | FSW, STRESS RELIEF, MACHINED AND LPB | 2.5 | TRANSVERSE |
| 7 | FSW, STRESS RELIEF | 2.5 | LONGITUDINAL |

*FIG. 22*

| SAMPLE ID | TARGET STRESS (ksi) | TARGET STRESS (MPa) | CYCLES TO FRACTURE | BREAK | FRACTURE: ADVANCING SIDE OR RETREATING SIDE? | PROCESS USED |
|---|---|---|---|---|---|---|
| BJ-T-1 | 116 | 800 | 20168 | NO | N/A | PM |
| BJ-T-2 | 95 | 655 | 73762 | NO | N/A | PM |
| BJ-T-3 | 90 | 621 | 70717 | YES | N/A | PM |
| BJ-T-4 | 90 | 621 | 94974 | YES | N/A | PM |
| BJ-T-5 | 90 | 621 | 351633 | NO | N/A | PM |
| BJ-T-6 | 90 | 621 | 167941 | YES | N/A | PM |
| BJ-T-7 | 90 | 621 | 141177 | YES | N/A | PM |
| BJ-T-8 | 90 | 621 | 1100000 | NO | N/A | PM |
| BJ-T-9 | 92 | 634 | 684794 | YES | N/A | PM |
| BJ-T-10 | 93 | 641 | 155643 | YES | N/A | PM |
| BJ-T-11 | 94 | 648 | 109897 | YES | N/A | PM |
| BJ-T-12 | 91 | 627 | 1033522 | NO | N/A | PM |
| BJ-T-13 | 93 | 641 | 99635 | YES | N/A | PM |
| BJ-T-14 | 92 | 634 | 1004392 | NO | N/A | PM |
| BJ-T-15 | 110 | 758 | 16725 | YES | N/A | PM |
| BJ-T-16 | 105 | 724 | 61639 | YES | N/A | PM |
| BJ-T-17 | 100 | 690 | 57809 | YES | N/A | PM |
| BJ-T-18 | 95 | 655 | 56262 | YES | N/A | PM |
| BJ-L-1 | 95 | 655 | 84463 | NO | N/A | PM |
| BJ-L-2 | 85 | 586 | 119419 | NO | N/A | PM |
| WJ-T-1 | 90 | 621 | 55812 | YES | HAZ | TW, SR |
| WJ-T-2 | 90 | 621 | 24750 | YES | HAZ | TW, SR |
| D1 | 60 | 414 | 68378 | YES | Ret-HAZ | TW, SR |
| D11 | 40 | 276 | 137990 | YES | WELD | LW, SR |
| D12 | 30 | 207 | 308996 | YES | WELD | LW, SR |
| D13 | 35 | 241 | 643145 | YES | Ret-HAZ | TW, SR |

| SAMPLE ID | TARGET STRESS (ksi) | TARGET STRESS (MPa) | CYCLES TO FRACTURE | BREAK | FRACTURE: ADVANCING SIDE OR RETREATING SIDE? | PROCESS USED |
|---|---|---|---|---|---|---|
| D14 | 45 | 310 | 192482 | YES | Ret-HAZ | TW, SR |
| D15 | 95 | 655 | 9802 | YES | Ret-HAZ | TW, SR |
| D16 | 75 | 517 | 28921 | YES | WELD | TW, SR |
| D17 | 31 | 214 | 1385053 | NO | | TW, SR |
| D18 | 40 | 276 | 1205385 | NO | | LW, SR |
| D19 | 95 | 655 | 108059 | YES | | LW, SR, M |
| D21 | 90 | 621 | 79105 | YES | BASE | TW, SR, M |
| D22 | 100 | 690 | 100807 | YES | HAZ | TW, SR, M |
| D23 | 85 | 586 | 174685 | YES | BASE | TW, SR, M |
| D24 | 75 | 517 | 163625 | YES | HAZ | TW, SR, M |
| D25 | 70 | 483 | 1047424 | NO | N/A | TW, SR, M |
| D26 | 72 | 496 | 254238 | YES | HAZ | TW, SR, M |
| D27 | 115 | 793 | 11599 | YES | Adv-HAZ | TW |
| D28 | 95 | 655 | 21145 | YES | Adv-HAZ | TW |
| D29 | 90 | 621 | 19844 | YES | Ret-HAZ | TW |
| D30 | 90 | 621 | 19662 | YES | Adv-HAZ | TW |
| D31 | 70 | 483 | 37349 | YES | Ret-HAZ | TW |
| D32 | 85 | 586 | 20593 | YES | Adv-HAZ | TW |
| D33 | 75 | 517 | 41033 | YES | Adv-HAZ | TW |
| D34 | 65 | 448 | 35708 | YES | Ret-HAZ | TW |
| D35 | 55 | 379 | 61934 | YES | Ret-HAZ | TW |
| D36 | 45 | 310 | 163937 | YES | Ret-HAZ | TW |
| D37 | 35 | 241 | 466701 | YES | Ret-HAZ | TW |

| SAMPLE ID | TARGET STRESS (ksi) | TARGET STRESS (MPa) | CYCLES TO FRACTURE | BREAK | FRACTURE: ADVANCING SIDE OR RETREATING SIDE? | PROCESS USED |
|---|---|---|---|---|---|---|
| D38 | 30 | 207 | 1003523 | NO | | TW |
| D39 | 32 | 221 | 613580 | YES | Ret-HAZ | TW |
| D40 | 31 | 214 | 656288 | YES | Ret-HAZ | TW |
| D64 | 80 | 552 | 142279 | YES | Ret-HAZ | TW, SR, M |
| D65 | 95 | 655 | 27070 | YES | Ret-HAZ | TW, SR, M |
| D66 | 98 | 636 | 34222 | YES | Ret-HAZ | TW, SR, M |
| D67 | 71 | 490 | 1203927 | NO | | TW, SR, M |
| D68 | 72 | 496 | 1080864 | NO | | TW, SR, M |
| D69 | 74 | 510 | 1204715 | NO | | TW, SR, M |
| D70 | 75 | 517 | 1005651 | NO | | TW, SR, M |
| D74 | 90 | 621 | 89818 | YES | WELD | TW, SR, LPB |
| D75 | 80 | 552 | 223724 | YES | BASE | TW, SR, LPB |
| D76 | 75 | 517 | 376391 | YES | WELD | TW, SR, LPB |
| D77 | 70 | 483 | 684889 | YES | GRIP | TW, SR, LPB |
| D78 | 75 | 517 | 371021 | YES | WELD | TW, SR, LPB |
| D79 | 78 | 469 | 1204425 | NO | | TW, SR, LPB |
| D80 | 79 | 496 | 1203123 | NO | | TW, SR, LPB |
| D83 | 95 | 655 | 142550 | CRACK | | TW, SR, M, LPB |
| D84 | 85 | 586 | 247942 | YES | HAZ | TW, SR, M, LPB |
| D85 | 90 | 621 | 107163 | YES | HAZ | TW, SR, M, LPB |
| D86 | 82 | 565 | 1204330 | NO | | TW, SR, M, LPB |
| D87 | 84 | 579 | 425892 | YES | BASE | TW, SR, M, LPB |

*FIG. 25*

WELDING IN PREPARATION FOR SUPERPLASTIC FORMING

CROSS REFERENCE TO RELATED APPLICATION

This application claims the benefit of the filing date of corresponding U.S. Provisional Patent Application No. 61/199,296, entitled "Combined Friction Stir Welding and Superplastic Forming Manufacturing Methodology", filed Nov. 15, 2008.

BACKGROUND

1. Field

The present disclosure relates generally to welding metal pieces, and in particular, to welding titanium sheets. Still more particularly, the present disclosure relates to welding titanium sheets using friction stir welding.

2. Background

Forming is a process used to fabricate a component from materials, such as metal, plastics, and/or other suitable materials. The component may be for a part or assembly of an aircraft, for example. Superplastic forming is one type of forming process that heats a material such that the material has superplasticity. Superplasticity is the ability of a material to elongate in a uniform manner beyond about 100 percent of the length of the material. This uniform elongation of the material reduces the amount of necking of the material as compared to non-uniform elongation.

Necking occurs when a material deforms such that large amounts of strain may localize disproportionately in a portion of the material. As a result, this portion of the material may be narrower in thickness than other portions of the material in response to the deformation. In these examples, the deformation is an elongation. Necking can lead to inconsistencies, such as fractures and/or other types of inconsistencies, in the material.

With metals, superplastic forming involves placing a metal sheet between a die section and a lid section. This metal sheet may also be referred to as a blank. With some currently used die sections, one metal sheet may not be large enough to fabricate a component. With these types of die sections, a number of metal sheets may be welded together to form the blank. The number of metal sheets may be welded using friction stir welding.

With friction stir welding, edges of two metal sheets are brought together. Heat and mechanical energy are applied to the metal sheets to join the metal sheets at the edges. The heat and mechanical energy cause portions of the metal sheets to form a continuous metallic region joining the two metal sheets. This region may be a weld nugget. This type of welding does not cause melting of the metal and avoids thermal distortion associated with the melting.

Typically, the die section has the shape of the component. The blank is forced to take the shape of the die section using pressurized gas. The pressurized gas may be introduced through the lid section. The die section may be heated to a temperature that affects the mechanical properties, fatigue performance, and/or other characteristics of the metal and the welded portions of the blank.

Therefore, it would be advantageous to have a method and apparatus, which takes into account one or more of the issues discussed above as well as other possible issues.

SUMMARY

An advantageous embodiment of the present disclosure forms a component by welding a plurality of sheets of metal to form a blank with a number of weld nuggets, placing the blank between a die section and a lid section, heating the die section to heat the blank, and introducing a pressurized gas between the lid section and the die section to press the blank into a mold in the die section to form a component. The number of weld nuggets has a desired thickness ratio between about 1.1 to about 1.25 after forming the component such that the plurality of sheets of metal and the component formed have a number of characteristics that are substantially the same.

An advantageous embodiment of the present disclosure is a welding machine comprising an anvil, a pin tool, and a cooling element, wherein the pin tool is rotated about an axis, is moved in a direction perpendicular to the axis, and exerts a downward force on a shim and a butt joint to weld a first piece of metal and a second piece of metal together to form a weld nugget in which the weld nugget has a desired thickness ratio between about 1.1 to about 1.25 after a superplastic forming process, and the first piece of metal, the second piece of metal, and the weld nugget have a number of characteristics that are substantially the same after the superplastic forming process.

Another advantageous embodiment of the present disclosure is a method for fabricating a component, the method comprising friction stir welding metal sheets together at a desired temperature to form a blank having a weld nugget; and using a superplastic forming process to form the component from the blank, wherein the weld nugget has a desired thickness ratio between about 1.1 to about 1.25 after the superplastic forming process, wherein the weld nugget and the metal sheets friction stir welded have a substantially constant strain rate between about $1 \times 10^{-2}$ inch per inch per second and about $5 \times 10^{-6}$ inch per inch per second, and wherein the metal sheets welded and the weld nugget have a number of characteristics that are substantially the same after the superplastic forming process.

Another advantageous embodiment of the present disclosure is a method of fabrication, comprising welding a plurality of titanium sheets to form a blank with a number of weld nuggets; placing the blank between a die section and a lid section, wherein the die section is heated to heat the blank; introducing a pressurized gas between the lid section and the die section to press the blank into a mold in the die section to form a component, wherein the number of weld nuggets have a desired thickness ratio between about 1.1 to about 1.25 such that the plurality of titanium sheets and the component formed have a number of characteristics that are substantially the same.

Another advantageous embodiment of the present disclosure is a method for fabricating a titanium structure, the method comprising friction stir welding multiple titanium pieces together to form a blank with a weld nugget, wherein the weld nugget has a desired superplasticity; and forming the titanium structure from the blank, wherein the weld nugget elongates between about 1 percent to about 25 percent less than other portions of the blank during the forming of the titanium structure.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 9 is an illustration of a welding device in accordance with an advantageous embodiment;

FIG. 10 is an illustration of a cross sectional view of a weld in accordance with an advantageous embodiment;

FIG. 21 is an illustration of a table of test results in accordance with an advantageous embodiment;

FIG. 22 is an illustration of a table of test results in accordance with an advantageous embodiment;

FIG. 23 is an illustration of a table of test results in accordance with an advantageous embodiment;

FIG. 24 is an illustration of a table of test results in accordance with an advantageous embodiment; and FIG. 25 is an illustration of a table of test results in accordance with an advantageous embodiment.

DETAILED DESCRIPTION

Figure 1:
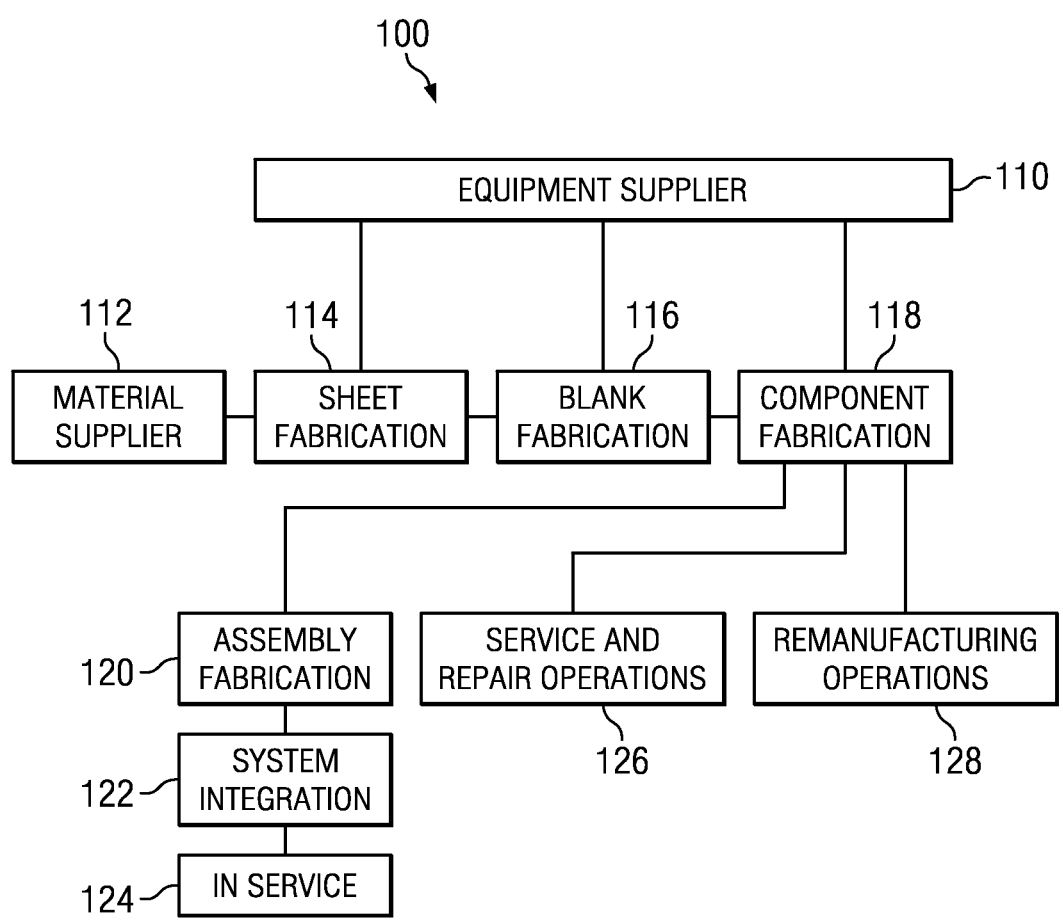
FIG. 1 is an illustration of a manufacturing environment employing forming and stir welding in accordance with an advantageous embodiment.

With reference now to FIG. 1, an illustration of a manufacturing environment is depicted in accordance with an advantageous embodiment. In this illustrative example, manufacturing environment 100 is used to manufacture components such as, for example, without limitation, parts, assemblies, parts of an aircraft, hinges, skin panels, spars, ribs, and/or other suitable components. Equipment supplier 110 provides equipment and material supplier 112 provides materials for use in manufacturing environment 100. In this illustrative example, equipment supplier 110 provides equipment to be used in sheet fabrication 114, blank fabrication 116, and component fabrication 118. Material supplier 112 provides materials, such as metal, to be used in sheet fabrication 114.

Sheet fabrication 114 forms a sheet of metal from the metal provided by material supplier 112. This sheet of metal is then used by blank fabrication 116. In this illustrative example, blank fabrication 116 forms a blank using a number of sheets of metal formed by sheet fabrication 114. For example, blank fabrication 116 may involve friction stir welding to form the blank. "A number of", when referring to items, means one or more items. For example, a number of apparatus embodiments may be one or more apparatus embodiments.

The blank is used by component fabrication 118 to form a component. As one example, the component may be a skin panel of an aircraft. The component may be used to form an assembly of an aircraft in assembly fabrication 120. The assembly may be, for example, a fuselage of an aircraft. The assembly is used in system integration 122. For example, when the system is an aircraft, the assembly may be incorporated into the aircraft in system integration 122. The system is then placed into service at in service 124.

In some illustrative examples, the component formed in component fabrication 118 may be used in service and repair operations 126 and/or remanufacturing operations 128.

Figure 2:
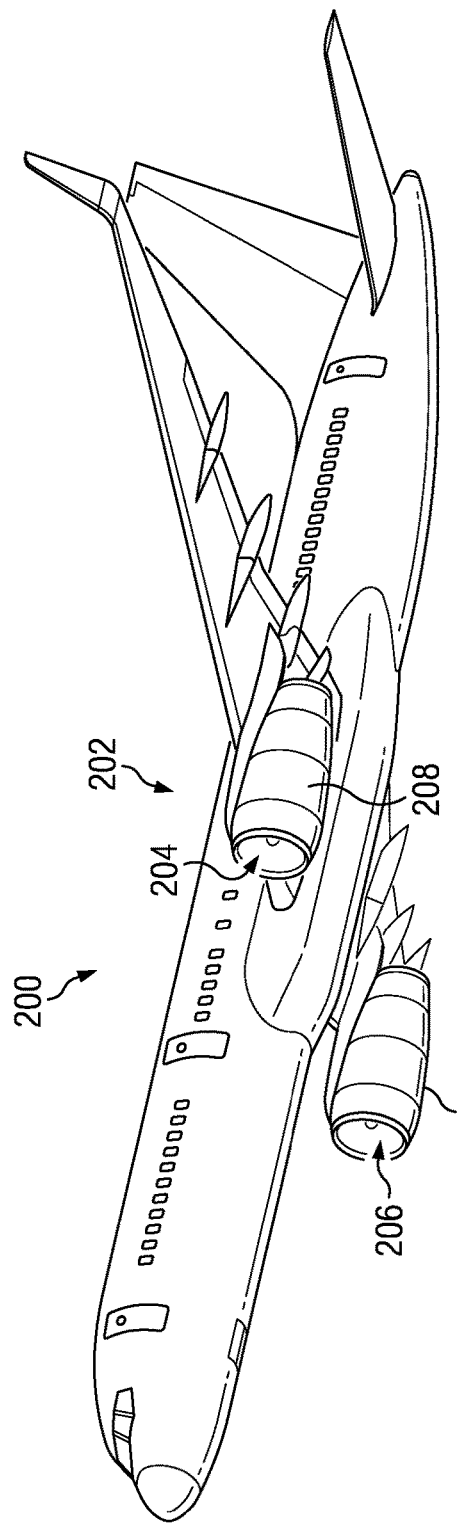
FIG. 2 is an illustration of an aircraft in accordance with an advantageous embodiment.

With reference now to FIG. 2, an illustration of an aircraft is depicted in accordance with an advantageous embodiment. In this illustrative example, aircraft 200 takes the form of jet aircraft 202. Jet aircraft 202 is an example of a platform for which components may be made using manufacturing environment 100 in FIG. 1. For example, components for the housing of jet engine 204 and the housing of jet engine 206 of jet aircraft 202 may be fabricated in manufacturing environment 100. These housings take the form of nacelle 208 for jet engine 204 and nacelle 210 for jet engine 206.

Figure 3:
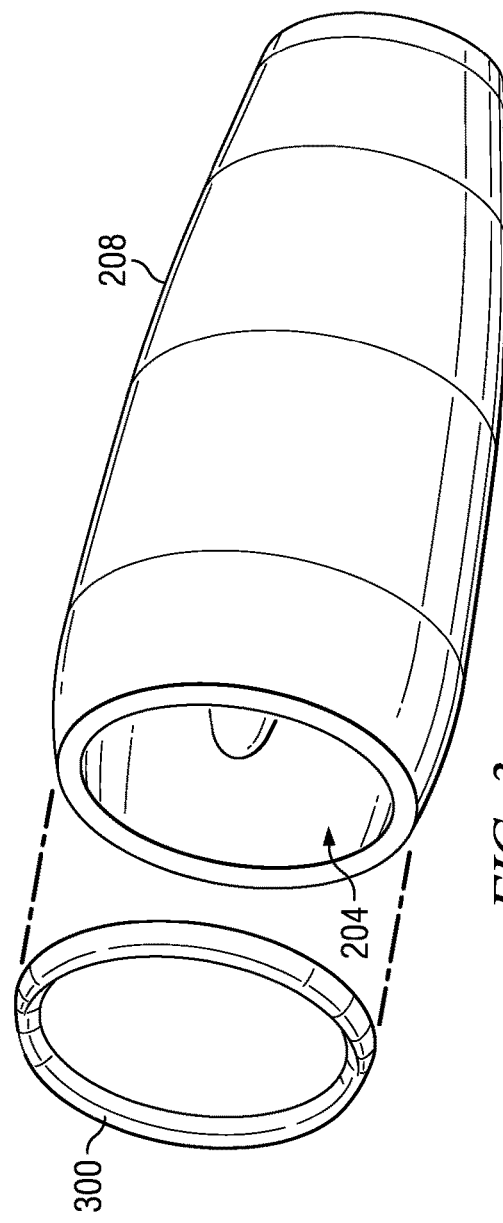
FIG. 3 is an illustration of an exploded view of a jet engine in accordance with an advantageous embodiment.

Turning now to FIG. 3, an illustration of an exploded view of a jet engine is depicted in accordance with an advantageous embodiment. In this illustrative example, jet engine 204 of FIG. 3 is depicted with nacelle 208. As depicted, nacelle 208 has lipskin 300. Lipskin 300 is the leading edge of nacelle 208. In this illustrative example, lipskin 300 is made of metal. Lipskin 300 is an example of a component that may be formed in component fabrication 118 in manufacturing environment 100 in FIG. 1.

The different advantageous embodiments recognize and take into account a number of different considerations. The different advantageous embodiments recognize and take into account that a component formed from multiple pieces may have a reduced performance as compared to a component formed from a single piece. For example, with some currently available nacelles, the lipskins of these nacelles are formed from multiple pieces of aluminum fastened together with fasteners. These fasteners and the seams of the fastened pieces may lead to an uneven surface of the lipskin. This uneven surface may lead to undesired turbulent flow of air over the lipskin during a flight of an aircraft. This undesired turbulence may produce drag, which in turn may reduce the fuel efficiency of an aircraft.

The different advantageous embodiments recognize and take into account that a lipskin formed from a single piece may lead to a more substantially laminar flow of air over the lipskin than a lipskin formed from multiple pieces. Further, the different advantageous embodiments recognize and take into account that a single piece of aluminum may be used to form a lipskin. However, the different advantageous embodiments recognize and take into account that titanium may have an ability to withstand higher temperatures as compared to aluminum.

Further, titanium also has properties desired for aerospace platforms, such as, for example, a desired weight, a desired strength, resistance to corrosion, compatibility with composite materials, a desired coefficient of thermal expansion, and an ability to be formed using a forming process. The different advantageous embodiments also recognize and take into account that using titanium to fabricate large components may be limited by the size of currently available sheets of titanium. Currently, titanium sheets may be available up to a size of about 1.2 meters by about 3.6 meters. As a specific example, some lipskins have diameters greater than about 10 meters. The different advantageous embodiments recognize that a single sheet of titanium may not be used to form these types of lipskins.

With these types of lipskins, a blank fabricated from more than one sheet of titanium may be used.

Further, the different advantageous embodiments recognize and take into account that the performance of a component formed from multiple sheets of metal may depend on the effects of the welding of the multiple sheets of metal. For example, the welding of multiple sheets of metal may affect the properties of the welded regions.

The different advantageous embodiments recognize and take into account that welding of superplastic materials used to form a blank may lead to undesired effects when the blank is used in a superplastic forming process. For example, fusion welding of superplastic metals may cause a greater superplastic strain to be produced in the parent material adjacent to a weld nugget as compared to the weld nugget. This superplastic strain in the parent material may lead to premature necking of the blank.

The different advantageous embodiments also recognize and take into account that after welding metal sheets to form a blank, a number of characteristics of the parent metal in the blank and the weld nugget in the blank may not be substantially the same after the welding and/or after a superplastic forming process. For example, with currently available processes for friction stir welding, a weld nugget may have a decreased strength as compared to the parent material in the blank. Further, the weld nugget may have undesired fatigue characteristics as compared to the parent material.

Still further, the different advantageous embodiments take into account and recognize that the weld nugget may have a different grain composition as compared to the parent material. This difference in grain composition may lead to undesired characteristics in a component formed from the blank using the superplastic forming process. The different advantageous embodiments recognize that having a component with a number of characteristics substantially the same as the metal sheets welded together before and after the superplastic forming process may be desirable.

Thus, the different advantageous embodiments provide a method and apparatus for forming a blank from titanium. An advantageous embodiment of the present disclosure forms a component by welding a plurality of sheets of metal to form a blank with a number of weld nuggets, placing the blank between a die section and a lid section, heating the die section to heat the blank, and introducing a pressurized gas between the lid section and the die section to press the blank into a mold in the die section to form a component. The number of weld nuggets has a desired thickness ratio between about 1.1 to about 1.25 such that the plurality of sheets of metal and the component formed have a number of characteristics that are substantially the same.

Figure 4:
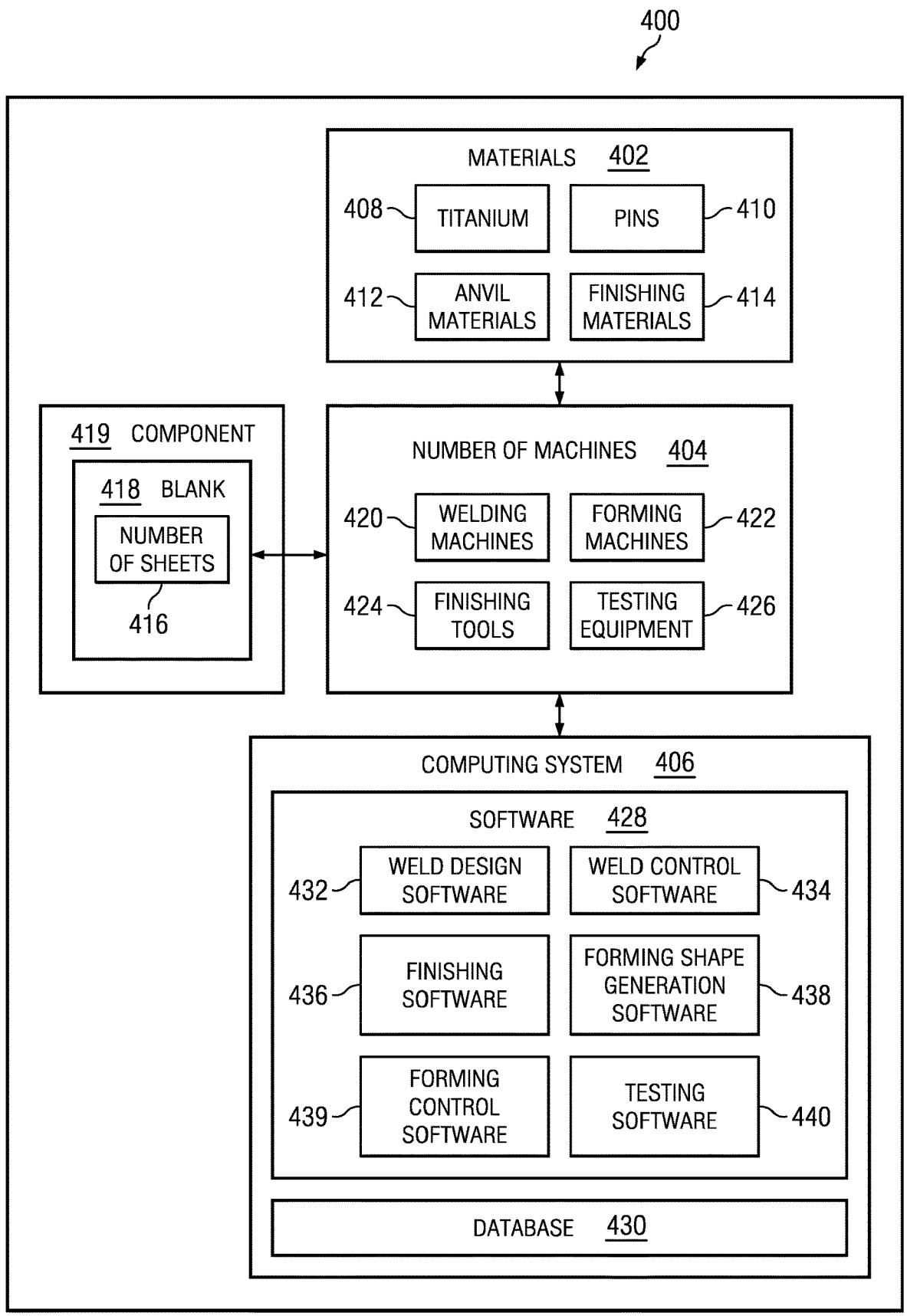
FIG. 4 an illustration of a manufacturing environment in accordance with an advantageous embodiment.

With reference now to FIG. 4, an illustration of a manufacturing environment is depicted in accordance with an advantageous embodiment. In these illustrative examples, manufacturing environment 400 may be an example of one implementation of the portion of manufacturing environment 100 in FIG. 1 used in sheet fabrication 114, blank fabrication 116, and component fabrication 118. Further, manufacturing environment 400 may be used to fabricate components for a platform, such as aircraft 200 in FIG. 2. In particular, manufacturing environment 400 may be used to fabricate lipskin 300 of nacelle 208 in FIG. 3.

Manufacturing environment includes materials 402, number of machines 404, and computing system 406. In this illustrative example, materials 402 include titanium 408, pins 410, anvil materials 412, finishing materials 414, and/or other suitable materials. Pins 410 may be, for example, stirring pins used in friction stir welding devices. In these examples, materials 402 may be supplied by material supplier 112 in FIG. 1. Titanium 408 is used to form number of sheets 416 of titanium 408. Stir welding pins 410, anvil materials 412, and finishing materials 414 are used to form blank 418 from number of sheets 416.

In other advantageous embodiments, metals other than titanium 408 may be used. For example, materials 402 may include, without limitation, at least one of a metal alloy, aluminum, titanium, magnesium, steel, aluminum alloys, titanium alloys, magnesium-aluminum alloys, aluminum-lithium alloys, nickel-chromium-iron alloys, nickel-steel alloys, metal superalloys, and/or other suitable types of metal.

In these illustrative examples, number of sheets 416 and blank 418 are formed from materials 402 using number of machines 404. Number of machines 404 is also used to form component 419 using blank 418. Component 419 may be, for example, lipskin 300 in FIG. 3. In other illustrative examples, component 419 may take the form of a skin panel, a spar, a rib, or some other suitable type of component.

Number of machines 404 may include, for example, without limitation, welding machines 420, forming machines 422, finishing tools 424, and testing equipment 426. Number of machines 404 is an example of equipment that may be supplied by equipment supplier 110 in FIG. 1. As depicted in these examples, number of machines 404 is controlled by computing system 406.

In this illustrative example, computing system 406 may be comprised of a number of computers. Further, computing system 406 includes software 428 and database 430. Software 428 includes weld design software 432, weld control software 434, finishing software 436, forming shape generation software 438, forming control software 439, and testing software 440. Weld design software 432 and weld control software 434 are run on computer system 406 to control welding operations performed on number of sheets 416 by welding machines 420.

In this depicted example, finishing software 436 is run to control finishing operations performed on blank 418 by finishing tools 424. Forming shape generation software 438 and forming control software 439 are run to control forming machines 422 which form component 419 from blank 418. Testing software 440 is run to control the testing of blank 418 and component 419 by testing equipment 426.

In this illustrative example, database 430 stores information used by software 428 to control number of machines 404. This information may be, for example, without limitation, data, commands, messages, parameters for number of machines 404, safety guidelines, and/or other suitable types of information. Parameters for number of machines 404 may include, for example, without limitation, a thickness for number of sheets 416, a grain size for titanium 408, a spindle speed in revolutions per minute for welding machines 420, a feed rate for welding machines 420, and/or other suitable parameters.

The illustration of manufacturing environment 400 in FIG. 4 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
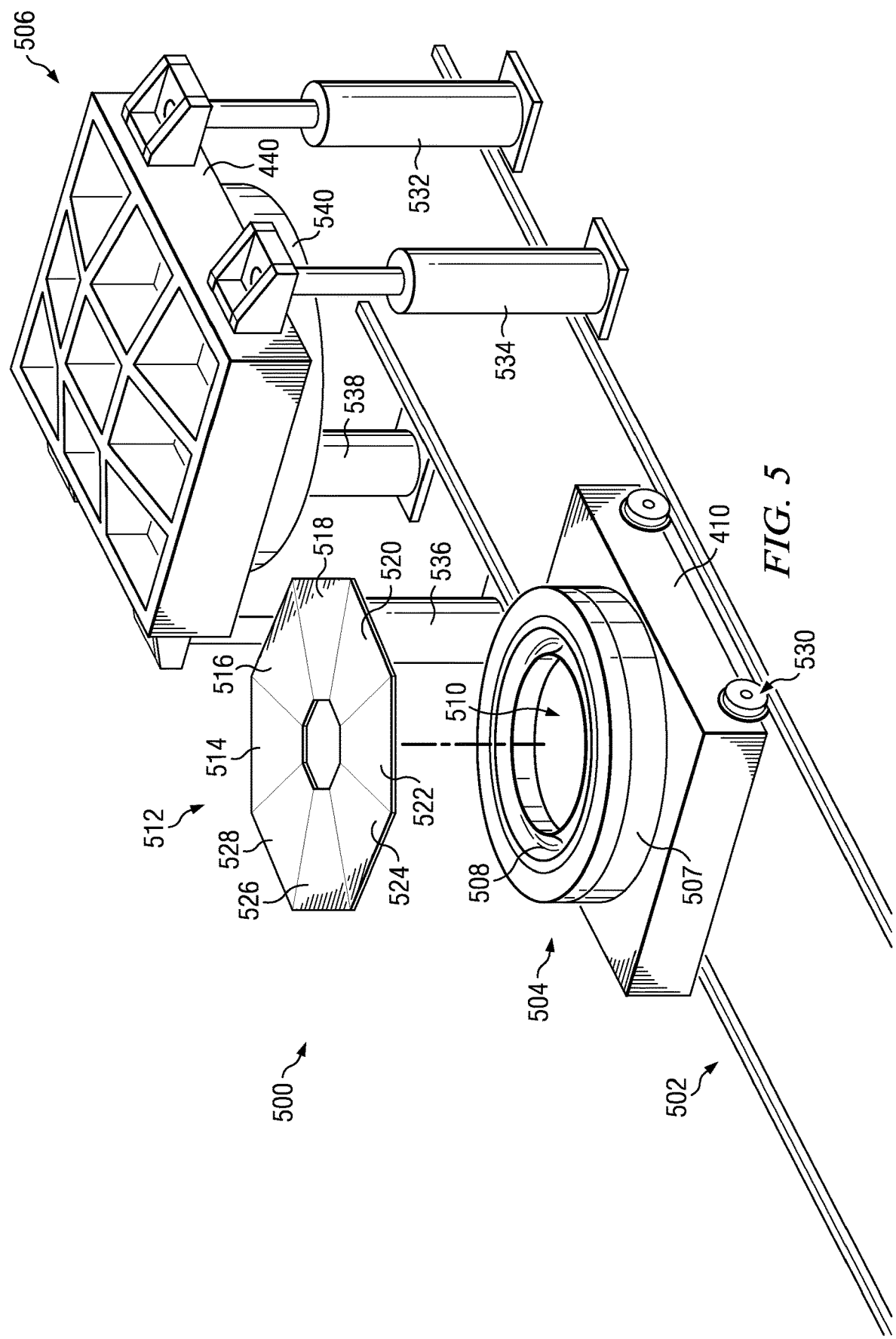
FIG. 5 is an illustration of a manufacturing environment in accordance with an advantageous embodiment.

With reference now to FIG. 5, an illustration of a manufacturing environment is depicted in accordance with an advantageous embodiment. In this illustrative example, manufacturing environment 500 is an example of one implementation of manufacturing environment 400 in FIG. 4. In manufacturing environment 500, a forming process is used to form a lipskin, such as lipskin 300 in FIG. 3. The forming process may be a superplastic forming process.

In this illustrative example, manufacturing environment 500 includes rail system 502, die section 504 and lid section 506. Die section 504 has base 507 and mold 508 with shape 510. Shape 510 may be the shape of the lipskin to be formed. As depicted in this example, channel 508 receives blank 512. Blank 512 is comprised of a number of sheets of titanium. These sheets of titanium include titanium sheet 514, titanium sheet 516, titanium sheet 518, titanium sheet 520, titanium sheet 522, titanium sheet 524, titanium sheet 526, and titanium sheet 528. In other illustrative examples, blank 512 may be formed from a different number of sheets of titanium.

As depicted, titanium sheets 514-528 have customized shapes. In other words, titanium sheets 514-528 are configured such that when positioned relative to each other, titanium sheets 514-528 form a donut-like shape to form blank 512. In these illustrative examples, the customized shapes for titanium sheets 514-528 may be cut from a plurality of titanium sheets such that at least about 75 percent of the plurality of titanium sheets are used for each of titanium sheets 514-528.

Blank 512 is placed over die section 504. Die section 504 is moved over rail system 502 towards lid section 506 using wheel system 530 of die section 504. Die section 504 is moved until blank 512 is positioned under lid section 506. Lid section 506 may be lowered onto blank 512 using hydraulic joists 532, 534, 536, and 538. In this illustrative example, lid section 506 may be lowered such that press 540 engages blank 512. When press 540 engages blank 512, pressurized gas may be introduced through press 540 such that blank 512 is pressed into mold 508 of die section 502. Blank 512 is pressed into mold 508 such that blank 512 takes the form of shape 510 of the lipskin being formed.

Figure 6:
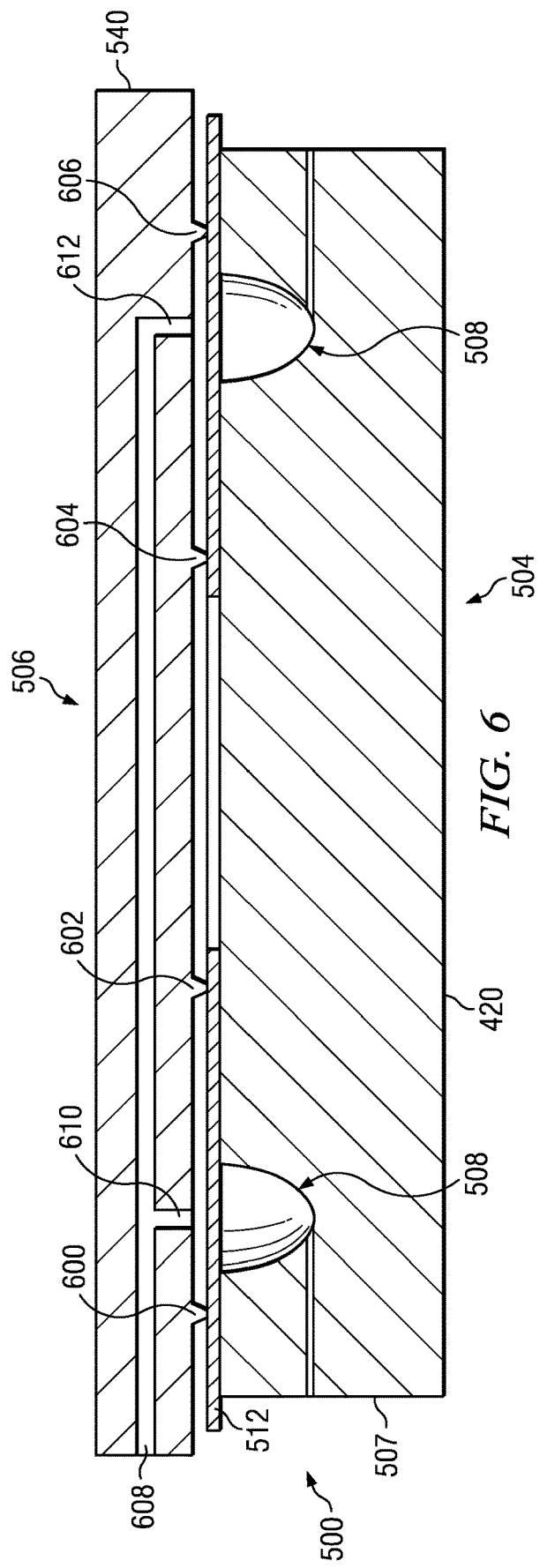
FIG. 6 is an illustration of a cross section of a blank positioned between a die section and a lid section in accordance with an advantageous embodiment.

With reference now to FIG. 6, an illustration of a cross section of a blank positioned between a die section and a lid section is depicted in accordance with an advantageous embodiment. In this illustrative example, blank 512 rests on base 507 of die section 504. Press 540 is positioned over blank 512 and rests on top of blank 512. Further, press 540 rests on blank 512 using rests 600, 602, 604, and 606.

In this illustrative example, pressurized gas may be introduced through press 540 through channel 608. The pressurized gas may reach blank 512 through port 610 and port 612 of press 540. The pressurized gas may be used to press blank 512 into mold 508 of die section 504.

Figure 7:
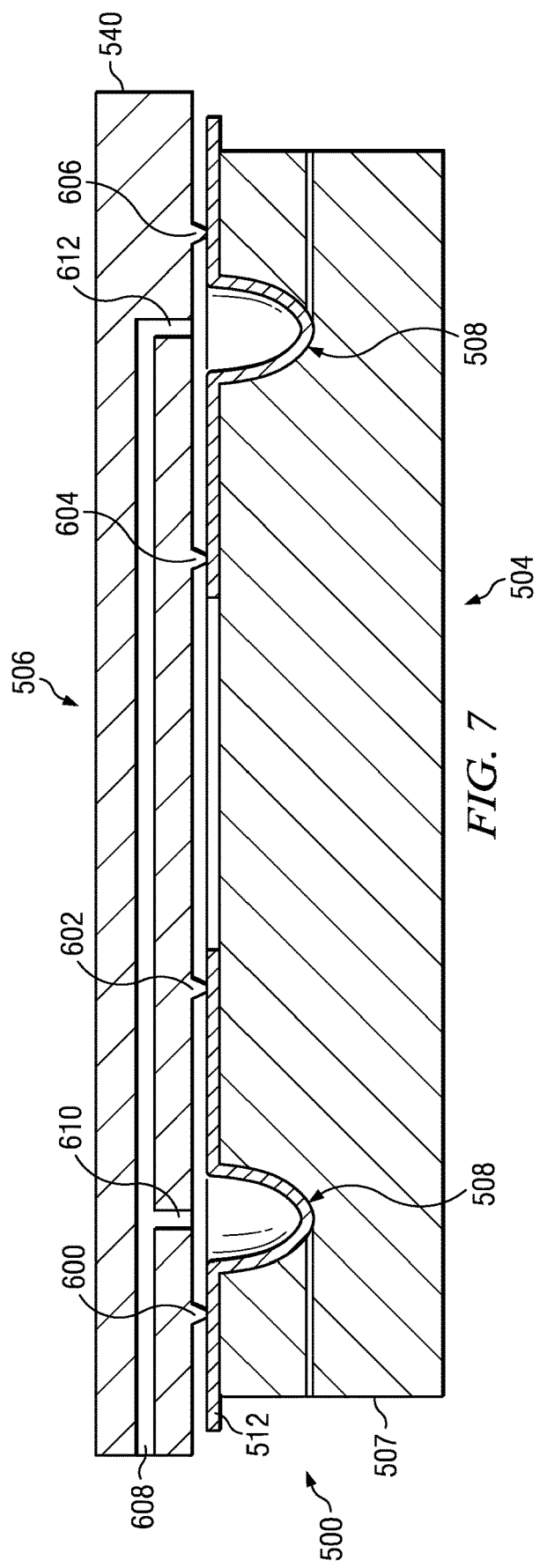
FIG. 7 is an illustration of a cross section of a blank pressed into a mold of a die section in accordance with an advantageous embodiment.

With reference now to FIG. 7, an illustration of a cross section of a blank pressed into a mold of a die section is depicted in accordance with an advantageous embodiment. In this illustrative example, die section 504 may be heated. The heat radiating from die section 504 and the pressurized gas entering through ports 610 and 612 allow blank 512 to be pressed into mold 508 of die section 504. As depicted, blank 512 may be pressed into mold 508 to form lipskin 700.

Figure 8:
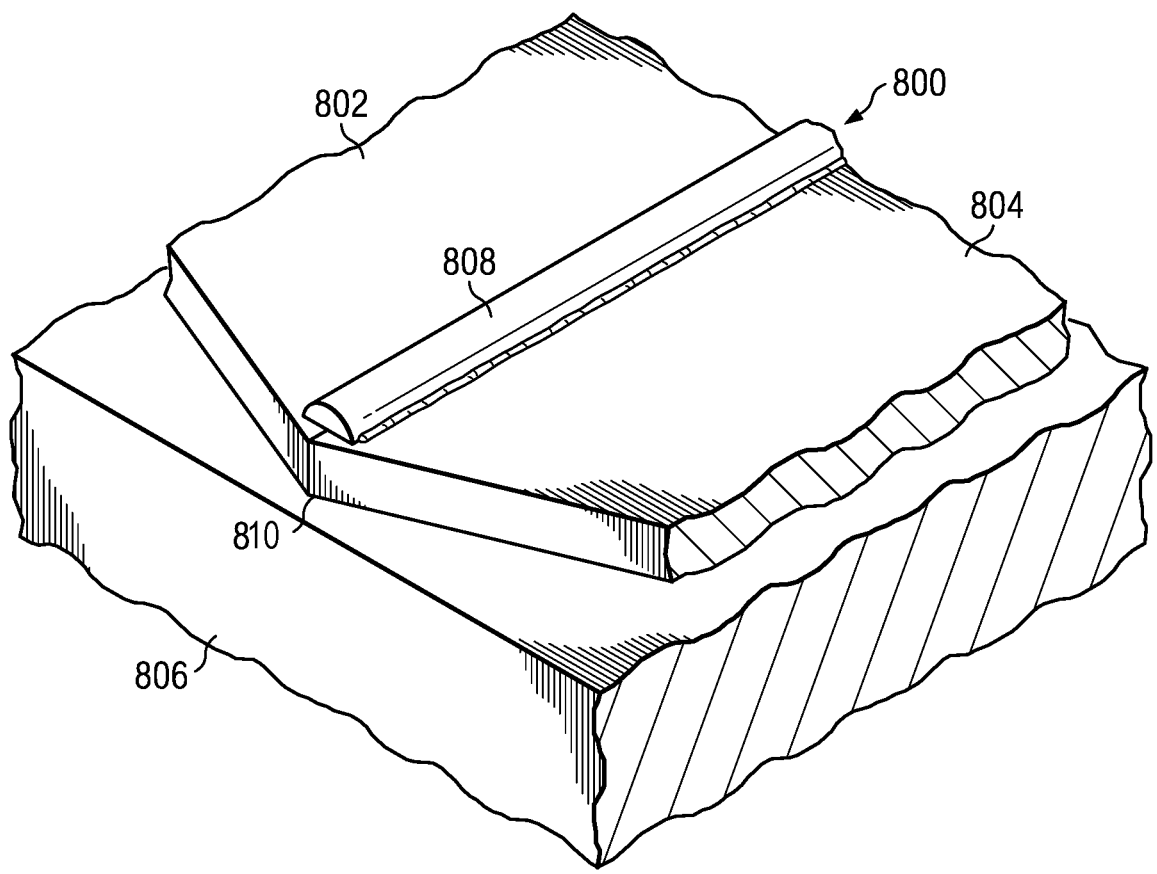
FIG. 8 is an illustration of a butt joint with a shim in accordance with an advantageous embodiment.

With reference now to FIG. 8, an illustration of a butt joint is depicted in accordance with an advantageous embodiment. In this illustrative example, butt joint 800 is formed by joining titanium sheet 802 and titanium sheet 804 over anvil 806. This joining of titanium sheet 802 and titanium sheet 804 may be performed using laser welding process 810. Further, shim 808 may also be joined to butt joint 800 using laser welding process 810.

With reference now to FIG. 9, an illustration of a welding device is depicted in accordance with an advantageous embodiment. In this illustrative example, welding device 900 is used to form weld 902 at butt joint 800. Welding device 900 forms weld 902 using friction stir welding in this illustrative example. Welding device 900 is comprised of welding tool 904 and stirring pin 906.

As depicted in this example, welding device 900 is moved along butt joint 800 in the direction of arrow 908. Further, stirring pin 906 rotates in the direction of arrow 910 as welding device 900 moves. Welding device 900 exerts force 912 as welding device 900 moves and stirring pin 906 rotates.

As welding device 900 welds titanium sheet 802 and titanium sheet 804 along with shim 808 together, weld nugget 914 is formed. Weld nugget 914 is formed from the displacement of portions of titanium sheet 802 and titanium sheet 804 as welding device 900 pushes down on butt joint 800. Markings 916 are formed on surface 918 of weld 902 as weld nugget 914 is formed. As depicted, markings 916 may have a circular shape due to the rotation of stirring pin 906.

Shim 808 laser welded to butt joint 800 ensures that after welding is performed along butt joint 800, weld nugget 914 has substantially the same thickness as the portions of titanium sheet 802 and titanium sheet 804 not welded.

With reference now to FIG. 10, an illustration of a cross sectional view of a weld is depicted in accordance with an advantageous embodiment. In this illustrative example, tip 1000 of stirring pin 906 of welding device 900 displaces portions of titanium sheet 802 and titanium sheet 804 to form weld nugget 914.

Contact between tip 1000 of stirring pin 906 and portions of titanium sheet 802 as titanium sheet 804 produces frictional heat as stirring pin 906 rotates and welding device 900 pushes downwards with force 912. This frictional heat softens the portions of titanium sheet 802 and titanium sheet 804 near tip 1000 of stirring pin 906. This softening allows weld nugget 914 to form. In this illustrative example, the temperature of weld nugget 914 does not exceed a melting point of titanium sheet 802 and titanium sheet 804. In this manner, porosity and/or thermal cracking may be reduced or avoided in weld nugget 914.

Figure 11:
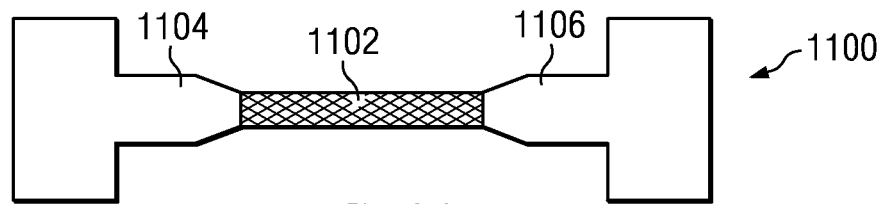
FIG. 11 is a test piece in accordance with an advantageous embodiment.
Figure 12:
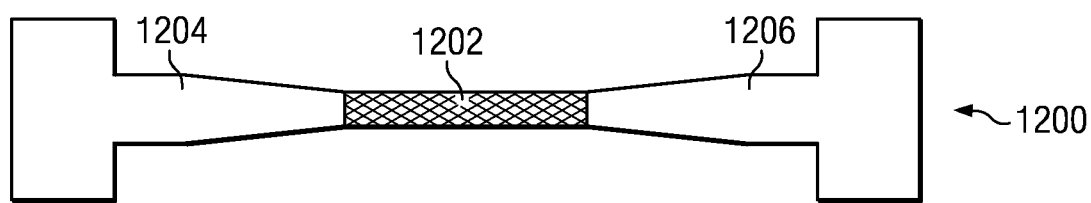
FIG. 12 is a test piece in accordance with an advantageous embodiment.
Figure 13:
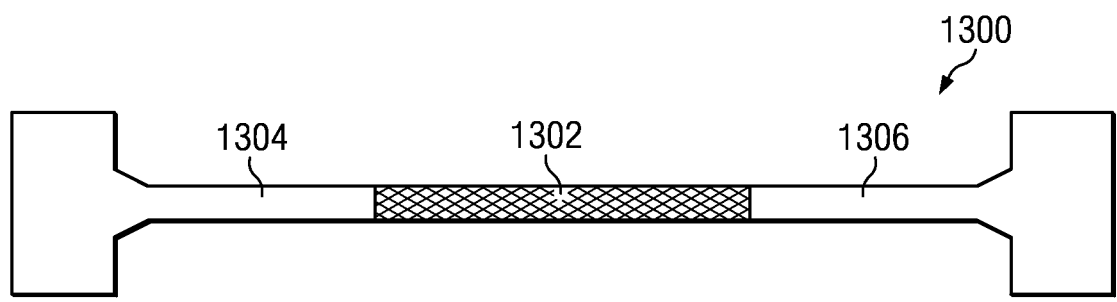
FIG. 13 is a test piece in accordance with an advantageous embodiment.

With reference now to FIGS. 11-13, illustrations of test pieces are depicted in accordance with an advantageous embodiment. In these illustrative examples, the test pieces are formed using a friction stir welding process to weld two pieces of titanium. The friction stir welding process forms a weld nugget in each test piece. The set of parameters selected for the friction stir welding process determine the superplastic characteristics of the weld nugget. Each test piece is elongated using a superplastic forming process to determine the amount of superplastic strain produced in the test piece. The amount of superplastic strain produced in a weld nugget as compared to the parent material of the test piece may be determined by calculating a thickness ratio using the following equation:

$$\text{thickness ratio} = (e_W)/(e_P)$$

where $e_P$ is the thickness of the parent material after superplastic elongation of the parent material, and $e_W$ is the thickness of the weld nugget after superplastic elongation of the weld nugget.

Turning first to FIG. 11, test piece 1100 has weld nugget 1102, portion 1104, and portion 1106. Portion 1104 and portion 1106 are the portions of test piece 1100 that comprise the parent material of test piece 1100, which is titanium in this example.

The set of parameters selected to form weld nugget 1102 are such that weld nugget 1102 has a lesser thickness as compared to portion 1104 and portion 1106. In other words, a greater superplastic strain is produced in weld nugget 1102 as compared to portion 1104 and 1106.

Turning now to FIG. 12, test piece 1200 has weld nugget 1202, portion 1204, and portion 1206. Portion 1204 and portion 1206 are comprised of the parent material of test piece 1200, which is titanium in this example.

The parameters selected for the friction stir welding process that formed weld nugget 1202 are such that portion 1204 and portion 1206 have a greater thickness as compared to weld nugget 1202. In other words, a greater superplastic strain is produced in portion 1204 and portion 1206 as compared to weld nugget 1202.

Turning now to FIG. 13, test piece 1300 has weld nugget 1302, portion 1304, and portion 1306. Portion 1304 and portion 1306 are comprised of the parent material of test piece 1200, which is titanium in this example.

The parameters selected for the friction stir welding process that formed weld nugget 1302 are such that weld nugget 1302, portion 1304, and portion 1306 experience substantially the same thickness. In other words, substantially the same amount of superplastic strain is produced in weld nugget 1302, portion 1304, and portion 1306. Further, weld nugget 1302, portion 1304, and portion 1306 are elongated uniformly across test piece 1300 such that portions 1304 and 1306 experience substantially no tapering.

In this illustrative example, a thickness ratio of about 1.0 may be calculated. A thickness ratio of about 1.00 indicates that the parent material of test piece 1300 and weld nugget 1302 have substantially the same thickness after elongating.

When using a blank in a forming process, a thickness ratio of about 1.1 to about 1.25 is desired. With a thickness ratio of about 1.1 to about 1.25, a weld nugget may have a thickness about 1 percent to about 25 percent more than the parent material after elongating. This thickness allows the weld nugget and the parent material to have a number of characteristics substantially the same after elongating. These characteristics may include, for example, without limitation, strength, fatigue characteristics, fracture toughness performance, corrosion resistance, impact damage tolerance, grain composition, and/or other suitable characteristics.

The grain composition of a material may include at least one of the following: a grain size, a grain orientation, a grain density within the material, and/or other suitable characteristics of grains.

In the different advantageous embodiments, the superplastic strain of a weld nugget may be determined by the welding process used to form the weld nugget. For example, with a friction stir welding process, the superplastic strain of a weld nugget may be decreased as the spindle speed and feed rate of the friction stir welding device are increased. In the different advantageous embodiments, a superplastic strain for the blank is between about $1 \times 10^{-2}$ inch per inch per second and $5 \times 10^{-6}$ inch per inch per second.

A friction stir welding process may be adjusted to achieve the desired superplastic strain for a weld nugget. This adjustment may be based on the relative temperature produced across a weld nugget during the friction stir welding process. Further, a pseudo heat ratio may be used to make the adjustment. The pseudo heat ratio is calculated using the following equation:

$$\text{pseudo heat ratio} = (N)^2/(\text{fr})$$

where N is the spindle speed in revolutions per minute (rpm) and fr is the feed rate expressed in millimeters per second (mm/sec).

In these illustrative examples, the values calculated for the pseudo heat ratio are used to interpret the amount of heat generated due to the amount of friction developed during the friction stir welding process. The pseudo heat ratio calculated values may be scaled to fit a data plot. Changes in the spindle speed may have a greater effect on the amount of thermal energy developed during friction stir welding as compared to changes in the feed rate.

Figure 14:
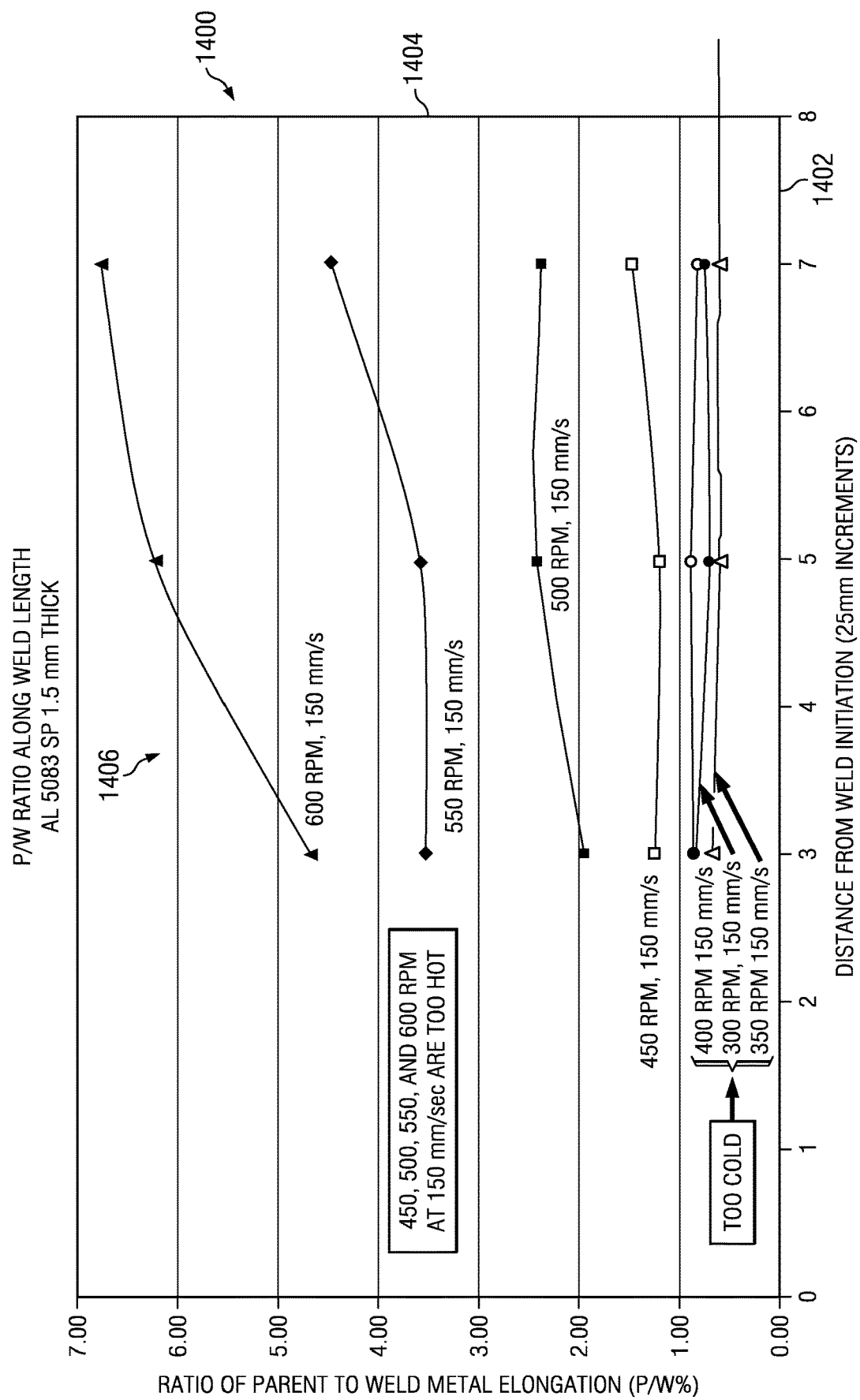
FIG. 14 is an illustration of a graph of thickness ratios in accordance with an advantageous embodiment.

With reference now to FIG. 14, an illustration of a graph of thickness ratios is depicted in accordance with an advantageous embodiment. In this illustrative example, graph 1400 plots the ratio of the thickness of a parent material of a test piece to a weld nugget of the test piece. The parent material may be 5083-SP aluminum alloy in this illustrative example. Further, the weld nugget may be formed using a friction stir welding process.

Graph 1400 illustrates the plotting of thickness ratios for a test piece along a length of the test piece. Horizontal axis 1402 is the distance from the initiation of the welding process that formed the weld nugget. Vertical axis 1404 is the thickness ratio. Plots 1406 are for a constant feed rate of about 150 millimeters per second and varying spindle speeds.

Each of plots 1406 have three test points taken at a distance of about 75 millimeters, about 125 millimeters, and about 175 millimeters from the initiation of the welding process.

A thickness ratio of about 1 provides the desired superplastic strain for a weld nugget. Graph 1400 may be used to determine a spindle speed and feed rate that will provide a thickness ratio of about 1. A thickness ratio of about 1 may be achieved with a feed rate of about 150 millimeters per second and a spindle speed of about 420 revolutions per minute.

As depicted in graph 1400, as the spindle speed is increased, the superplastic strain of the weld nugget is decreased. As the spindle speed is increased, the amount of heat produced in the friction stir welding process may increase the temperature within the weld nugget. This increased temperature may reduce the superplasticity of the weld nugget.

Figure 15:
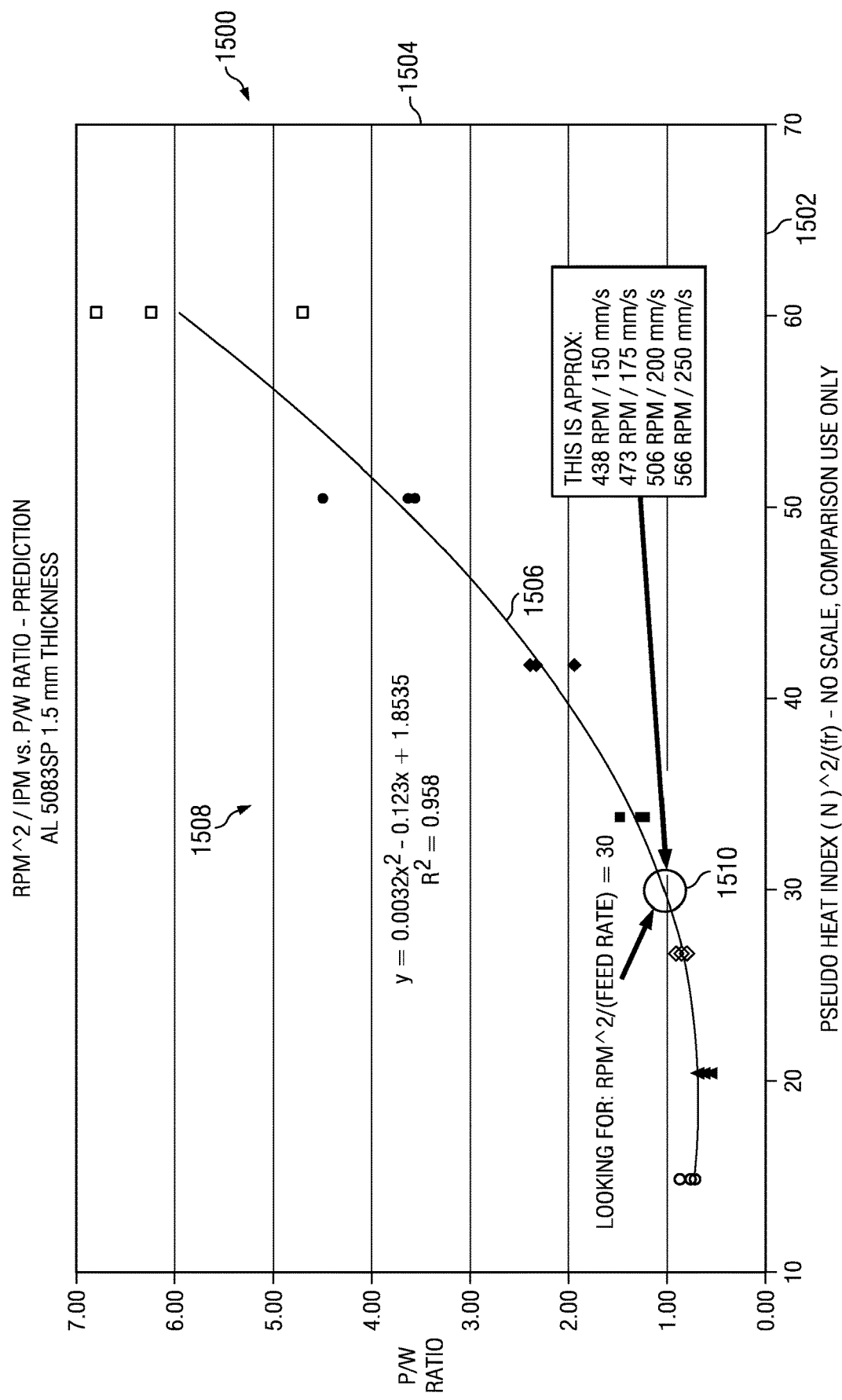
FIG. 15 is an illustration of a graph plotting pseudo heat ratios versus thickness ratios for a test piece in accordance with an advantageous embodiment.

With reference now to FIG. 15, an illustration of a graph plotting pseudo heat ratios versus thickness ratios for a test piece is depicted in accordance with an advantageous embodiment. In this illustrative example, graph 1500 has horizontal axis 1502 and vertical axis 1504. Horizontal axis 1502 is the pseudo heat ratio, and vertical axis 1504 is the thickness ratio. The thickness ratio is calculated as the thickness ratio.

In this illustrative example, curve 1506 is a curve that best fits plot points 1508 in graph 1500. As indicated by point 1510, a pseudo heat ratio of about 30 may provide a desired thickness ratio of about 1. Using the pseudo heat ratio of about 30, a number of values for the parameters of spindle speed and feed rate may be calculated. These values may be used to adjust the friction stir welding process in order to achieve a desired superplastic strain within a weld nugget.

In the different advantageous embodiments, the desired superplastic strain for a weld nugget is between about $1 \times 10^{-2}$ inch per inch per second and $5 \times 10^{-6}$ inch per inch per second. A weld nugget with this type of superplasticity has a thickness that is about 1 percent to about 25 percent thicker than the parent material after a superplastic forming process. The additional thickness of the weld nugget ensures that the weld nugget does not thin during the superplastic forming process.

Further, in the different advantageous embodiments, the friction stir welding process may be adjusted such that the weld nugget and the parent material have substantially the same grain composition. For example, when using fine-grain titanium to form a blank, the friction stir welding process may be adjusted such that the weld nugget formed has substantially the same grain composition as the parent titanium. By matching the grain composition of the weld nugget to the parent titanium, a desired superplasticity may be achieved for the blank.

Further, with both the weld nugget and the parent material having a similar grain composition, the superplastic forming process used to form the blank may be performed at temperatures between about 1425 degrees Fahrenheit to about 1450 degrees Fahrenheit. In some advantageous embodiments, the forming process may be performed at temperatures between about 1300 degrees Fahrenheit to about 1750 degrees Fahrenheit.

Figure 16:
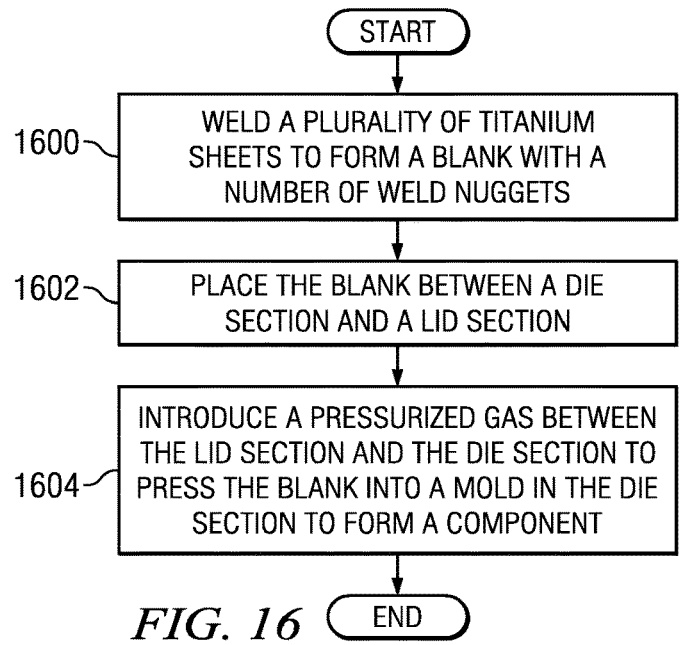
FIG. 16 is an illustration of a flowchart of a process for fabricating a component in accordance with an advantageous embodiment.

With reference now to FIG. 16, an illustration of a flowchart of a process for fabricating a component is depicted in accordance with an advantageous embodiment. The process illustrated in FIG. 16 may be implemented in manufacturing environment 400 in FIG. 4.

The process begins by welding a plurality of titanium sheets to form a blank with a number of weld nuggets (operation 1600). The weld nuggets may be formed at the portions of the titanium sheets joined together by the welding operation. The process then places the blank between a die section and a lid section (operation 1602). The die section may be a heated die section that in turn heats the blank to a temperature between about 1300 degrees Fahrenheit and about 1750 degrees Fahrenheit.

Thereafter, the process introduces a pressurized gas between the lid section and the die section to press the blank into a mold in the die section to form a component (operation 1604). Operations 1602 and 1604 may comprise a superplastic forming process. In operation 1604, the blank may be pressed into the mold such that the blank elongates with superplastic strain.

Further, the welding operation in operation 1600 may be performed such that a thickness ratio between about 1.1 to about 1.25 may be calculated for the blank in response to the superplastic forming process. In these illustrative examples, the thickness ratio is a ratio of the thickness of the parent material to the thickness of the weld nugget.

Figure 17:
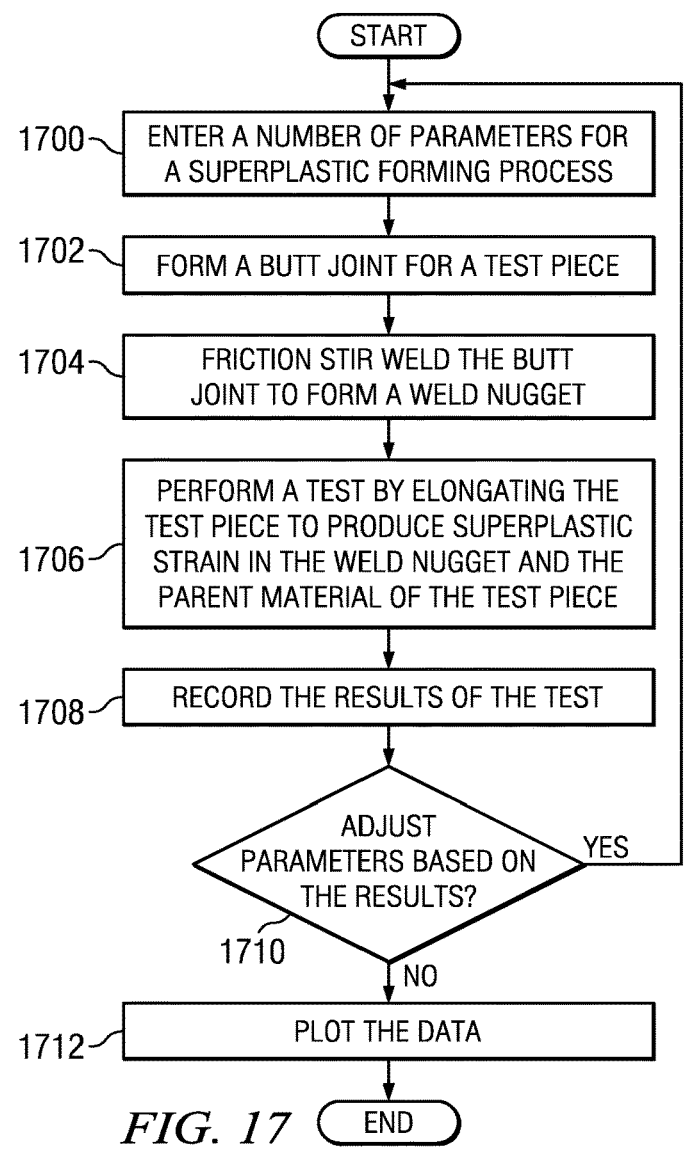
FIG. 17 is an illustration of a flowchart of a process for performing a test on a test piece in accordance with an advantageous embodiment.

With reference now to FIG. 17, an illustration of a flowchart of a process for performing a test on a test piece is depicted in accordance with an advantageous embodiment. The process illustrated in FIG. 17 may be implemented in manufacturing environment 400 using testing equipment 426 in FIG. 4.

The process begins by entering a number of parameters for a superplastic forming process (operation 1700). These parameters may be tested on a test piece such that the superplastic forming process may be adjusted when forming a blank. The parameters may include, for example, without limitation, thickness, grain size, forging load, spindle speed, feed rate, stirring pin wear, water flow, and/or other suitable parameters. The process then forms a butt joint for the test piece (operation 1702). Thereafter, the process friction stir welds the butt joint to form a weld nugget (operation 1704). The process then performs the test by elongating the test piece to produce superplastic strain in the weld nugget and the parent material of the test piece (operation 1706).

The process records the results of the test (operation 1708). The process then determines whether parameters should be adjusted based on the results (operation 1710). If parameters are not to be adjusted, the process plots the data (operation 1712), with the process terminating thereafter. Otherwise, the process returns to operation 1700.

Figure 18:
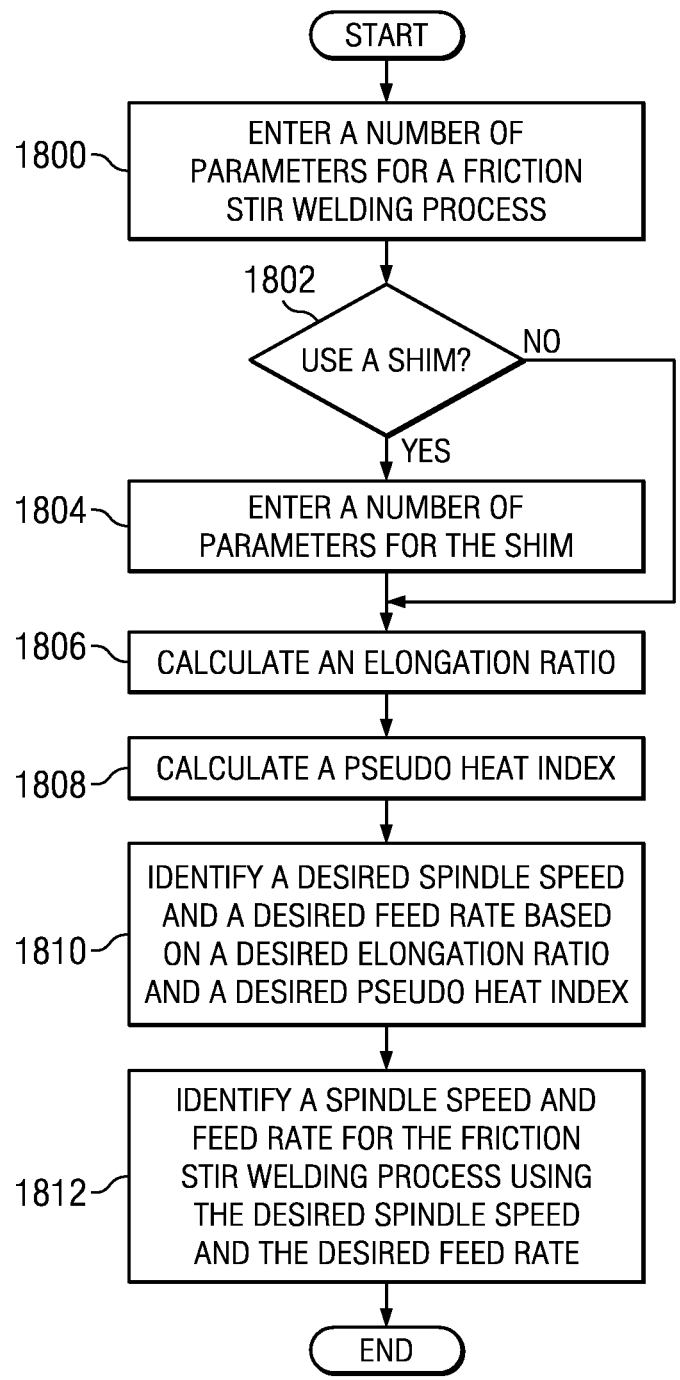
FIG. 18 is an illustration of a process for identifying parameters for a friction stir welding process in accordance with an advantageous embodiment.

With reference now to FIG. 18, an illustration of a process for identifying parameters for a friction stir welding process is depicted in accordance with an advantageous embodiment. In this illustrative example, the process illustrated in FIG. 18 may be implemented in manufacturing environment 400 in FIG. 4.

The process begins by entering a number of parameters for a friction stir welding process (operation 1800). These parameters may include, for example, without limitation, thickness, grain size, and/or other suitable parameters. The process then determines whether a shim is to be used (operation 1802). If a shim is to be used, the process then enters a number of parameters for the shim (operation 1804). These parameters include, for example, without limitation, thickness and grain size.

The process then calculates a thickness ratio (operation 1806) and a pseudo heat index (operation 1808) based on the parameters entered. Operations 1806 and 1808 may be performed by accessing a database of values. Thereafter, the process then identifies a desired spindle speed and a desired feed rate based on a desired thickness ratio and desired pseudo heat index (operation 1810). The desired spindle speed and the desired feed rate are then used to identify a spindle speed and feed rate for the friction stir welding process (operation 1812), with the process terminating thereafter.

With reference again to operation 1802, if a shim is not to be used, the process continues to operation 1806 as described above.

Figure 19:
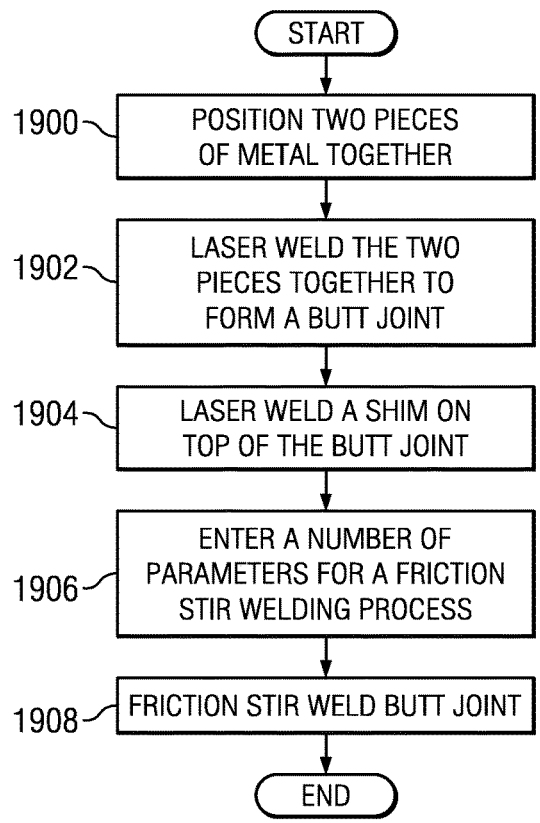
FIG. 19 is an illustration of a process for friction stir welding in accordance with an advantageous embodiment.

With reference now to FIG. 19, an illustration of a process for friction stir welding is depicted in accordance with an advantageous embodiment. The process illustrated in FIG. 19 may be implemented in manufacturing environment 400 in FIG. 4.

The process begins by positioning two pieces of metal together (operation 1900). The process then laser welds the two pieces of metal to form a butt joint (operation 1902). The process laser welds a shim on top of the butt joint (operation 1904). Thereafter, the process enters a number of parameters for a friction stir welding process (operation 1906). These parameters may include a spindle speed in revolutions per minute, a feed rate, pin wear, force, and/or other suitable parameters. The process then friction stir welds the butt joint (operation 1908), with the process terminating thereafter.

Figure 20:
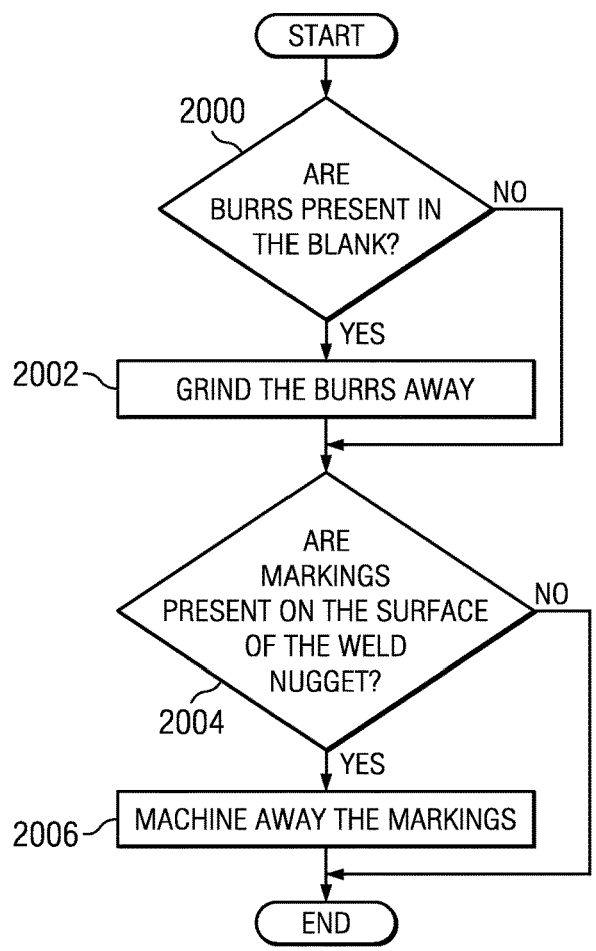
FIG. 20 is an illustration of a flowchart of a process for performing finishing operations in accordance with an advantageous embodiment.

With reference now to FIG. 20, an illustration of a flowchart of a process for performing finishing operations is depicted in accordance with an advantageous embodiment. The process illustrated in FIG. 20 may be implemented in manufacturing environment 400 in FIG. 4.

The process begins by determining whether burrs are present in a blank that has been friction stir welded (operation 2000). If burrs are present, the process grinds the burrs away (operation 2002). The process then determines whether markings are present on the surface of the weld nugget (operation 2004). If markings are not present, the process terminates. Otherwise, if markings are present, the process machines away the markings (operation 2006), with the process terminating thereafter. With reference again to operation 2000, if burrs are not present, the process continues to operation 2004 as described above.

With reference now to FIGS. 21-25, illustrations of tables of test results are depicted in accordance with an advantageous embodiment. In these illustrative examples, the tables are examples of results that may be generated by performing the test in operation 1706 and then recorded in operation 1708 in FIG. 17.

Turning first to FIG. 21, table 2100 is depicted in accordance with an advantageous embodiment. Turning next to FIG. 22, table 2200 is depicted in accordance with an advantageous embodiment. Turning next to FIG. 23, table 2300 is depicted in accordance with an advantageous embodiment. Turning next to FIG. 24, table 2400 is depicted in accordance with an advantageous embodiment. Turning next to FIG. 25, table 2500 is depicted in accordance with an advantageous embodiment.

In an embodiment, forming the titanium structure is performed using a process selected from one of a superplastic forming process and a hot creep forming process. In an embodiment, a processing step includes substantially avoiding any alpha case formation on an inner surface of the inlet by using a sealed pack comprising two joined sheets and a gas tube portal, whereby the air between the sheets is replaced with an inert gas via applying a vacuum and a flooding with an inert gas. In an embodiment, a separate bulkhead may be installed inside the formed lipskin as an aide to concentrate de-icing heating air at the forward tip of the nacelle. In an embodiment, segments of the blank are locally thickened to achieve a thicker formed section to accommodate fastener requirements or to resolve higher localized stress than in other areas where the extra thickness is not required. In an embodiment, segments of the blank are locally laser welded prior to friction stir welding to avoid a lack of penetration of the weld at the bottom of the butt joint after friction stir welding and superplastic forming. The description of the different advantageous embodiments has been presented for purposes of illustration and description, and is not intended to be exhaustive or limited to the embodiments in the form disclosed. Many modifications and variations will be apparent to those of ordinary skill in the art.

Although the different advantageous embodiments have been described with respect to aircraft, the different advantageous embodiments also recognize that some advantageous embodiments may be applied to other types of platforms. For example, without limitation, other advantageous embodiments also recognize that some advantageous embodiments may be applied to a mobile platform, a stationary platform, a land-based structure, an aquatic-based structure, a space-based structure and/or some other suitable object. More specifically, the different advantageous embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, and/or some other suitable object.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. A method of fabricating a lipskin of an aircraft nacelle, the method comprising steps of:

forming trapezoidal titanium sheets from larger titanium sheets by cutting the larger titanium sheets;

locally laser welding the trapezoidal titanium sheets together to form a butt joint between each one of the trapezoidal titanium sheets and an adjacent one of the trapezoidal titanium sheets, resulting in a plurality of butt joints, comprising local laser welds;

laser welding titanium shims over the plurality of butt joints so that each of the titanium shims is parallel to a corresponding one of the plurality of butt joints, wherein each of the titanium shims has a transverse cross-section, shaped as a portion of a circle;

forming a blank, comprising a central opening that comprises a first plurality of linear portions and further comprising a peripheral contour that comprises a second plurality of linear portions, by friction stir welding the trapezoidal titanium sheets together along the plurality of butt joints to produce continuous friction stir welds such that the titanium shims and at least portions of the local laser welds are consumed into the continuous friction stir welds, comprising weld nuggets;

controlling a spindle speed (N) and a feed rate (fr) during the step of friction stir welding the trapezoidal titanium sheets together to form the continuous friction stir welds such that the weld nuggets have substantially identical grain composition to that of the trapezoidal titanium sheets, and wherein the spindle speed (N) and the feed rate (fr) are controlled to achieve a pseudo heat ratio of about 30;

the pseudo heat ratio equals to $(N)^2/(fr)$; and

N is expressed in revolutions per minute (rpm) and fr is expressed in millimeters per second (mm/sec); and superplastically forming the lipskin of the aircraft nacelle from the blank; and wherein after the lipskin is superplastically formed from the blank, the weld nuggets are from about 1 percent to about 25 percent thicker than the trapezoidal titanium sheets.

2. The method of claim 1, further comprising incorporating the lipskin into an aircraft.

3. The method of claim 1, wherein:

each one of the trapezoidal titanium sheets comprises a first side, a second side that is parallel to the first side and is shorter than the first side, a third side that extends from a first end of the first side to a first end of the second side, and a fourth side that extends from a second end of the first side to a second end of the second side and is oblique relative to the third side; and the step of forming the butt joint between each one of the trapezoidal titanium sheets and the adjacent one of the trapezoidal titanium sheets, resulting in the plurality of butt joints, comprises forming one of the plurality of butt joints between the third side of each of the trapezoidal titanium sheets and the fourth side of an adjacent one of the trapezoidal titanium sheets such that when all of the trapezoidal titanium sheets are joined together, the first sides of the trapezoidal titanium sheets, in concert, form an outer polygonal edge of the blank and the second sides of the trapezoidal titanium sheets, in concert, form an inner polygonal edge of the blank.

4. The method of claim 3, wherein the trapezoidal titanium sheets are eight in number.

5. The method of claim 1, further comprising:

placing the blank on a die section such that the blank rests on a base of the die section;

placing a lid section such that a press rests on the blank using a plurality of rests; and introducing pressurized gas through a channel and a plurality of ports in the press.

6. The method of claim 1, wherein the weld nuggets have a superplastic strain between about $1 \times 10^{-2}$ inch per inch per second and $5 \times 10^{-6}$ inch per inch per second.

7. The method of claim 6, wherein the step of friction stir welding the trapezoidal titanium sheets together is controlled such that the weld nuggets and the trapezoidal titanium sheets have substantially identical grain compositions.

8. The method of claim 1 further comprising controlling a thickness ratio determined by dividing a thickness of the weld nuggets after superplastic elongation of the weld nuggets by the thickness of the trapezoidal titanium sheets after superplastic elongation of the trapezoidal titanium sheets.

9. The method of claim 8, wherein the thickness ratio is between about 1.1 to about 1.25.

10. The method of claim 8, wherein the thickness ratio is about 1.

* * * * *